UNITED STATES PATENT OFFICE.

FERDINAND ULZER AND RUDOLF SOMMER, OF VIENNA, AUSTRIA-HUNGARY.

PROCESS OF EXTRACTING RADIUM COMPOUNDS.

1,001,480. Specification of Letters Patent. Patented Aug. 22, 1911.

No Drawing. Application filed September 1, 1909. Serial No. 515,637.

*To all whom it may concern:*

Be it known that we, FERDINAND ULZER, professor of the Imperial and Royal Technical High School of Vienna, and RUDOLF SOMMER, chemist, subjects of the Emperor of Austria-Hungary, residing in Vienna, Austria-Hungary, and whose post-office address is 59 Währingerstrasse, Vienna, Austria-Hungary, have invented a new and useful Process of Extracting Radium Compounds from Radium-Containing Substances; and we do hereby declare the following to be a full, clear, and exact description of the invention, such as will enable others skilled in the art to which it appertains to make and use the same.

The process hitherto known and exclusively used in practice for manufacturing radium, first described by Curie and Debiérne, consists in boiling the radium-containing materials, generally pitch blende or residue from its treatment with concentrated soda lye, filtering, treating the residue with ordinary hydrochloric acid, filtering again, washing with water, then boiling in an excess of concentrated soda solution, filtering, carefully washing with water and decomposing by means of pure hydrochloric acid. These operations have to be repeated at least three times, in order to get the greater portion of the radium into solution. The raw chlorids obtained must then be purified in various manners before they are ready for fractional crystallization. The process is exceedingly tedious and expensive, owing to the fact that it is necessary to treat the whole of the other chemical compounds accompanying radium, namely 5–10,000 kg. per gram of radium, up to the moment of the last extraction by means of hydrochloric acid. It is therefore necessary to use an excessively large quantity of chemicals, but chiefly the washing operations are so complicated and difficult that the process in question alone occupies several months (see Haitinger & Ulrich, *Reports of the Imperial Academy of Sciences*, Vol. CXVII, section 11ª, May, 1908, pages 1–12). It will be obvious that the excessively high price and the great difficulty of obtaining radium preparations are due to the above process.

The present invention consists in the discovery of the fact that the so-called raw sulfates obtained from the hydrochloric acid solution of radium chlorid by precipitation with sulfuric acid, can be obtained in a much shorter time, even in a few days, and at a considerably smaller cost, by treating the radium-containing substances by a process comprising only the alternative combination of a treatment with sulfuric acid or agents developing sulfuric acid (such as bisulfates) with a treatment by alkaline agents in such a manner that the residue of the foregoing treatment is subjected after thorough washing and filtering to the following treatment, whereby in case of the alkaline treatment being the second, a final treatment with sulfuric acid is employed.

The process may be carried out in the following manner: The radium-containing substances are boiled for several hours with concentrated sulfuric acid, or exposed to the action of concentrated sulfuric acid at normal temperature for some weeks or melted with bisulfates. The residue, remaining after repeated washing with water and filtering, is boiled with caustic alkalis or carbonates of alkalis at a high pressure or melted therewith and the residue remaining after repeated washing with water and filtering is boiled with dilute sulfuric acid. It may be stated that the order of the stages of the process may be varied, so that the same final effect is obtained by treating first with alkaline agents and then with the acid agents. In this process, about half of the admixtures are removed by the treatment with acid agents, and the greater portion of the other compounds is removed by the treatment with alkaline substances, so that there remains only a residue of about half per cent., in which almost the whole radium is contained in the form of sulfate. As the washing process is mostly completed by boiling three times, and the solid bodies can be easily separated from the liquids by decanting and filtered at all stages, the process according to this invention does not offer any technical difficulties from any point of view, and can be carried out in a very short time and with little difficulty. The raw sulfates may be converted quickly and almost completely into the raw chlorids, by melting them with alkaline carbonates or mixtures of said carbonates, washing thoroughly with water, filtering, and dissolving the residue in pure hydrochloric acid. The following examples will give a better idea of the process. Pitch blende contains silicic acid, oxids of iron, aluminum, zinc, lead, calcium, strontium, barium, radium, some silver, various rare earth metals, nickel, cobalt and uranium. The residue obtained by producing the so called uranium colors is the residue forming the raw material in the present process. It contains the same metals except uranium.

1. 100 kg. of finely ground pitch blende residue are mixed with about 400 kg. of concentrated sulfuric acid and heated for several hours until the sulfuric acid begins to fume. The change of the originally dark brown color of the mixture to light brown or gray indicates that the compounds being soluble in sulfuric acid, have been dissolved. The mass is then introduced into 10–20 times the quantity of water, boiled, left to stand, decanted and washed twice with water and filtered. The dry residue weighs about 45–50 kg. It is then heated with 130–150 kg. of commercial caustic soda in iron crucibles until a uniform liquid molten mass or flux is obtained, which generally occurs in one to two hours. This molten mass or flux is then boiled several times with about 1000 liters of water each time, left to stand, decanted and finally filtered. The still moist residue is boiled with about 5 kg. of dilute sulfuric acid, preferably one part acid to ten parts of water, filtered and washed with water. The residue remaining after the last washing operation consists of the raw sulfate of radium. About 0.5 kg. of raw sulfates are thus obtained. Said raw sulfates of radium contain 2–20 milligrams of raduim from 10,000 kg. of raw material, and small quantities of calcium, strontium, lead and the like.

2. 100 kg. of finely ground uranium pitch residue similar to that employed in Example 1 are heated with about 250 kg. of raw commercial bisulfate of soda in clay crucibles until the sulfuric acid begins to fume; the molten mass or flux is washed several times in about 1,000 liters of water, decanted and finally filtered. The residue is heated with about 150 kg. of commercial potash or sodium-potassium carbonate for about two hours, to a strong red heat, until a uniform molten mass or flux is obtained; the flux is boiled several times in about 1000 liters of water and filtered. The residue from filtering, after being treated with dilute sulfuric acid, yields about 0.2 kg. of raw sulfate.

3. 100 kg. of finest ground pitch blende residue similar to that employed in Example 1, are heated for 12 hours with 200 kg. of caustic potash and 50 kg. of water under agitation in a closed vessel until a pressure of 20 atm. is reached, washed with water and filtered. The residue from filtering is left to stand with 300 kg. of concentrated sulfuric acid for several weeks at normal temperature or better at elevated temperature until the color becomes uniformly gray. After thorough washing with water the raw sulfates are directly obtained.

4. 1 kg. of raw sulfate is melted with 8 kg. of carbonate of potassium or with sodium-potassium carbonate at red heat, until a uniform molten mass or flux is obtained. The flux after cooling is washed thoroughly with distilled water and filtered and the residue is dissolved in 4 kg. of hydrochloric acid free from sulfuric acid, the solution diluted with water and filtered and the filtrate is completely evaporated. The solid residue obtained is raw chlorid of radium which can be converted in a well known manner into pure chlorid of radium, for instance by way of fractional crystallization. The raw chlorid is radium chlorid contaminated by other chlorids, such as the chlorids of barium, calcium, lead, etc. Raw chlorid contains approximately 1 part of radium chlorid and 33 parts of other chlorids.

In the above examples, instead of caustic soda, other alkalis or mixtures of alkaline carbonates with their hydroxids, could also be used. In the same way, sodium bisulfate could be replaced by potassium bisulfates, etc.

The raw product obtained in the manner described, can be used for most pharmaceutical purposes without further purification. For obtaining bathing preparations, the radium chlorid is left to stand either alone in water solution or with addition of other well known bath mixtures, such as iodin salts, iron salts, mud, and so on, in solid or liquid form, in air-tight vessels, until the highest activity is reached.

Having thus described our invention, we claim:—

1. Process of extracting radium compounds from radium containing material, which consists in treating said material in separate operations with a strong acid reagent containing the sulfate radical, at an elevated temperature and with an alkaline reagent, washing the residue after each operation and separating the radium salt from the resulting residue.

2. Process of extracting radium compounds from radium containing material, which consists in treating the said material in separate operations with concentrated sulfuric acid and with an alkaline reagent, washing the residue after each operation, and separating the radium salt from the resulting residue.

3. Process of extracting radium compounds from radium containing material, which consists in treating the said material in separate operations with concentrated sulfuric acid at an elevated temperature, and with an alkaline reagent, washing the residue after each operation and separating the radium salt from the resulting residue.

4. Process of extracting radium compounds, consisting in treating the radium containing substances at elevated temperature with concentrated sulfuric acid, washing and filtering the residue, treating such residue while it is subjected to a suitable degree of heat with caustic alkali, washing and filtering the resulting residue, and treating the last said residue with dilute sulfuric acid, substantially as described.

In testimony whereof we have signed our names to this specification in the presence of two subscribing witneses.

FERDINAND ULZER.
RUDOLF SOMMER.

Witnesses:
　VICTOR TISDILI,
　AUGUST FUGGER.